United States Patent
Sumorok

(10) Patent No.: US 7,356,032 B1
(45) Date of Patent: Apr. 8, 2008

(54) SYSTEM AND METHOD FOR REDUCING BROADCAST TRAFFIC WIRELESS ACCESS-POINT NETWORKS

(75) Inventor: Daniel M. Sumorok, Arlington, MA (US)

(73) Assignee: BBN Technologies Corp., Cambridge, MA (US)

( * ) Notice: Subject to any disclaimer, the term of this patent is extended or adjusted under 35 U.S.C. 154(b) by 1046 days.

(21) Appl. No.: 10/285,721

(22) Filed: Nov. 1, 2002

(51) Int. Cl.
*H04L 12/28* (2006.01)
*H04L 12/56* (2006.01)

(52) U.S. Cl. ...................................... 370/392; 370/400
(58) Field of Classification Search ................... None
See application file for complete search history.

(56) References Cited

U.S. PATENT DOCUMENTS

| | | | |
|---|---|---|---|
| 5,490,139 A | 2/1996 | Baker et al. | 370/60 |
| 5,737,328 A | 4/1998 | Norman et al. | 370/331 |
| 5,958,018 A | 9/1999 | Eng et al. | 709/246 |
| 5,987,062 A | 11/1999 | Engwer et al. | 375/225 |
| 6,061,739 A | 5/2000 | Reed et al. | 709/245 |
| 6,104,712 A | 8/2000 | Robert et al. | 370/389 |
| 6,151,305 A | 11/2000 | Chen | 370/238 |
| 6,151,319 A | 11/2000 | Dommety et al. | 370/395 |
| 6,154,461 A | 11/2000 | Sturniolo et al. | 370/401 |
| 6,701,361 B1 * | 3/2004 | Meier | 709/224 |
| 6,970,444 B2 * | 11/2005 | Chwieseni et al. | 370/338 |
| 7,020,701 B1 | 3/2006 | Gelvin et al. | |
| 2003/0012168 A1 | 1/2003 | Elson et al. | |
| 2003/0202505 A1 * | 10/2003 | Ozugur | 370/352 |

OTHER PUBLICATIONS

Office Action dated Nov. 2, 2007, U.S. Appl. No. 10/786,335.
Office Action dated Nov. 16, 2007, U.S. Appl. No. 10/649,030.
Office Action dated Dec. 13, 2007, U.S. Appl. No. 10/328,566.

* cited by examiner

*Primary Examiner*—Edan Orgad
*Assistant Examiner*—Blanche Wong
(74) *Attorney, Agent, or Firm*—Ropes & Gray LLP

(57) ABSTRACT

A method, apparatus, and article of manufacture for reducing broadcast traffic in a wireless backbone network. In operation, a wireless access point receives an address resolution protocol (ARP) message from a network device. The wireless access point determines the destination of the ARP message and attempts to identify the Ethernet address associated with the destination network device. If the Ethernet address cannot be determined, the access point sends an ARP request message to the other wireless access points on the network, requesting them to transmit ARP packets to the network device. When the desired network device comes within range of the network, the access points discontinue transmitting ARP packets and a message acknowledging the device's presence is transmitted to the original access point. This method of having access points periodically broadcast ARP packets to network devices reduces ARP broadcasting across the wireless backbone, thereby increasing network throughput.

14 Claims, 14 Drawing Sheets

| |
|---|
| 610 - Type (Request or Response) |
| 620 - Destination Hardware Address |
| 630 - Source Hardware Address |
| 640 - Destination IP Address |
| 650 - Source IP Address |

ARP Packet

SYSTEM AND METHOD FOR REDUCING BROADCAST TRAFFIC WIRELESS ACCESS-POINT NETWORKS

FIELD OF THE INVENTION

The invention relates generally to network communication systems, such as local area networks (LANs), and more particularly to network communication systems which are accessed by one or more mobile communication units. Even more particularly, the present invention relates to network communication systems which are efficient at handling broadcast network traffic.

DESCRIPTION OF THE RELATED ART

The use of wireless network communication systems that permit mobile units to communicate via an optical or radio link has become widespread. Retail stores and warehouses use such systems to track inventory and replenish stock. Employees enter inventory information using a handheld or portable communication unit which can be carried throughout the store or warehouse. In manufacturing facilities, such systems are useful for tracking parts, completed products and defects. In a medical environment, these systems can reduce the time needed to fill out forms and eliminate inaccuracies by allowing medical personnel to transmit data directly from a mobile communication unit carried by the medical personnel. One of the greatest challenges of wireless networks is that most wireless devices have a limited range in which they can communicate with other devices. Traditionally, this problem has been solved by populating an area with wireless "access points" which are all connected to a wired "backbone network". A wireless device is free to roam around as long it is in range of at least one of these access points. Two wireless network devices only need to be in range of access points connected to a backbone network in order to communicate. They do not have to be in range of each other and they do not have to be in range of the same access point.

One major limitation of the above network is the access points need to be connected to a wired backbone network. By replacing the wired backbone network with a wireless backbone network, an access point did not need to have any wires attached to it (except perhaps a power cable). In order for a wireless backbone network to be useful however, it had to provide a mechanism for access points not within wireless range of each other to communicate. One approach to solving this problem is for intermediate access points to relay network traffic for access points that are out of range of each other. Unfortunately, two access points that were especially far apart may require several intermediate access points to relay network traffic between them. The goal became to design network communication systems in which relaying could be efficiently performed such that only the minimum number of intermediate access points were used to relay network traffic between two out-of-range access points.

While a wireless backbone network can efficiently handle network traffic between any two nodes, it is less efficient at handling broadcast network traffic (i.e., network traffic that originates at one network device and is transmitted to every other device in the network). Most broadcast network traffic on Internet Protocol (IP) networks is in the form of Address Resolution Protocol (ARP) network traffic.

The ARP protocol is the means by which a network device learns the hardware address of another network device given that device's IP address. Each network device that supports the Internet Protocol has (at least) two addresses: a hardware address and an IP address. The hardware address is not location-dependent and is most often assigned when the network interface hardware is manufactured. The hardware address is usually permanent and associated with a physical device such that when the device is physically moved it keeps the same hardware address. An IP address, by contrast, is usually not bound to a physical device. IP addresses are usually assigned through software. While some devices keep the same IP addresses for extended periods of time, other devices change IP addresses regularly.

For reasons that are beyond the scope of this summary, a given network device can not communicate with a target network device if it does not know the target network device's hardware address. Therefore, the ARP protocol is used frequently on networks that support the IP protocol. Furthermore, ARP network traffic can often comprise the vast majority of broadcast network traffic on networks that support the IP protocol. The performance of networks that are inefficient at handling broadcast network traffic can be substantially increased by reducing ARP network traffic on these networks. Consequently, there is a need in the art for a network that can greatly reduce ARP broadcast traffic.

SUMMARY OF THE INVENTION

The present invention satisfies the above-described need by providing a mechanism for reducing broadcast traffic in a wireless backbone network by reducing ARP broadcast traffic. One method for reducing ARP broadcast traffic is to cache Ethernet/IP address pairs in each access point. In operation, an access point caches ARP responses from responding network devices. By utilizing the cache, the access point can then broadcast an ARP request to the wireless backbone network once for each out-of-range network device. When a wireless network device broadcasts an ARP packet for a particular network device, the access point can also look up the destination IP address in its cache and send a reply without having to broadcast the request throughout the wireless backbone network.

The present invention further satisfies the above described need by providing a mechanism for reducing broadcast traffic in a wireless backbone network that often must re-broadcast ARP traffic throughout the network. In this embodiment, a first network device seeking to discover the hardware address of a second (out of range) network device periodically broadcasts ARP request packets to an in-range access point. This in-range access point shall be designated at Access Point 1. Upon receipt of ARP packets, Access Point 1 determines whether it knows the hardware address of the second network device. If so, Access Point 1 forwards the ARP packet to the first network device. If Access Point 1 does not know the hardware address of the second network device, it forwards an ARP request packet to all other access points on the backbone network. These intermediate access points in turn periodically forward the ARP request to all in-range network devices for a predetermined period of time. During this period of time, Access Point 1 will not forward any more ARP requests it receives for the hardware address of the second network device. If the second network device responds prior to the termination the predetermined time, the response is transmitted via its in-range access point back to Access Point 1, which then forwards the response back to the original network device. If there is no response from the desired network device in the predetermined period of time, the intermediate access points terminate their periodic broadcasting of ARP requests. The advantage of this system is it limits the frequency that broadcast packets are sent over the wireless backbone network. Without this system, ARP packets for absent network devices can create unnecessary network traffic.

It is to be understood that both the foregoing general description and the following detailed description are exemplary and explanatory and are intended to provide further explanation of the invention as claimed.

Additional features and advantages of the invention will be set forth in the description which follows, and in part will be apparent from the description, or may be learned by practice of the invention.

BRIEF DESCRIPTION OF THE DRAWINGS

The features and other advantages of the invention will be realized and attained by the methods, systems, and apparatus particularly pointed out in the written description and claims hereof, as well as the accompanying drawings. In the drawings:

FIG. 6 is a chart depicting the major elements of an ARP message in accordance with the present invention;

DETAILED DESCRIPTION

Figure 1:
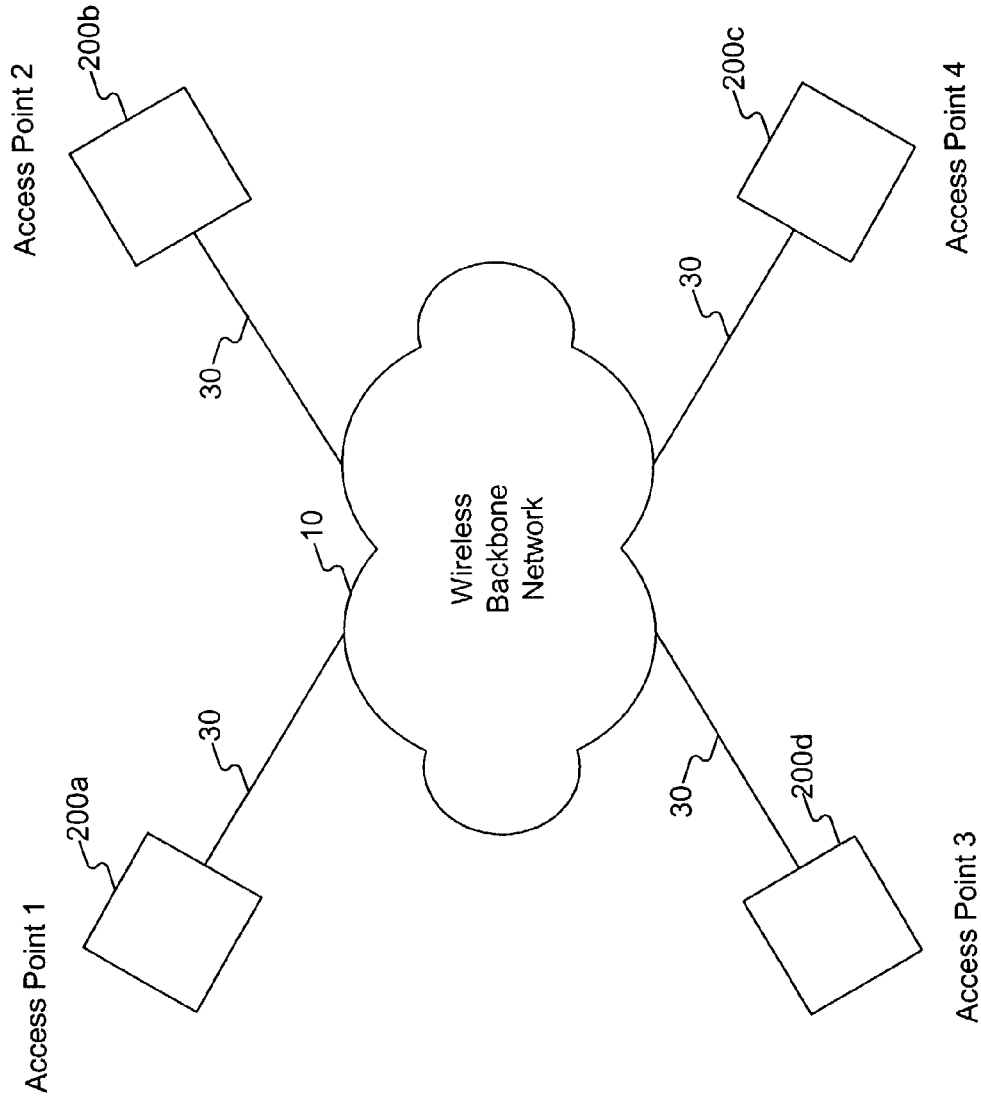
FIG. 1 is a diagram illustrating the Wireless Backbone network in accordance with the present system.

In the following detailed description of an embodiment, reference is made to the accompanying drawings that form a part thereof, and in which is shown by way of illustration a specific embodiment in which the invention may be practiced. This embodiment is described in sufficient detail to enable those skilled in the art to practice the invention and it is to be understood that other embodiments may be utilized and that structural changes may be made without departing from the scope of the present invention. The following detailed description is, therefore, not to be taken in a limited sense.

A distributed network in accordance with the present invention, comprises a plurality of access points that communicate with a wireless backbone network via an optical or radio link. The distributed network may comprise any one of a number of types of networks over which client computers and server computers communicate, including local area networks (LANs), wide area networks (WANs), the Internet and any other networks that distribute processing and share data among a plurality of nodes. Moreover, it will be appreciated that the access points provide wireless LAN access to the wireless backbone network for one or more mobile network devices.

Referring now to the drawings, in which like numerals represent like elements throughout the several figures, the present invention will be described.

In FIG. 1, a network communications system in accordance with the invention is generally designated 10. A plurality of access points 200a-d are coupled to network 10 via an optical or radio link 30. Each access point 200a-d has a cell or service area 240 (shown in FIG. 4) which is defined as the area surrounding the access point 200a-d within which it has the ability to transmit and receive relatively error-free data from a mobile network device 300 (shown in FIG. 4) within the area. While FIG. 1 only depicts four access points, it is understood by those of skill in the art that the number of access points 200 is only limited by the size and complexity of network 10.

Figure 2:
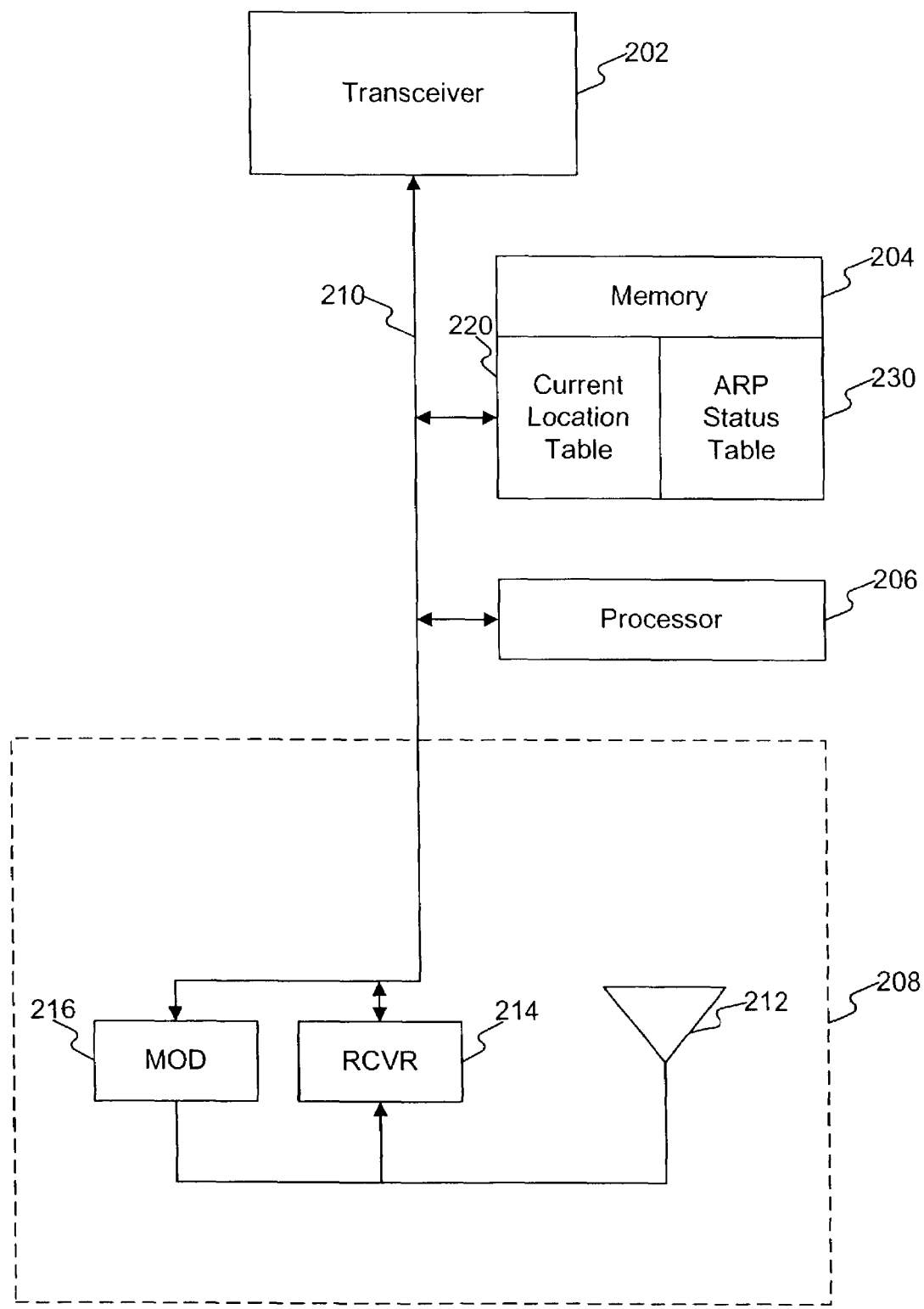
FIG. 2 is a diagram illustrating the major components of an Access Point in accordance with the present invention.

FIG. 2 shows a detailed block diagram of access point 200. As shown, access point 200 is comprised of a transceiver 202, memory 204, central processor 206, and RF section 208. RF section 208 is further comprised of an antenna 212, RF receiver 214 and modulator 216. The components of access point 200 communicate together via bus 210. Transceiver 202 is configured according to conventional network adaptor transceiver techniques to allow access point 200 to communicate over network 10. Central processor 206 is adapted to control access point 200 and to properly route messages from access point 200. Processor 206 may include any of a variety of microprocessors, including PENTIUM™ based microprocessors operating on Windows/NT, UNIX and/or Windows/CE operating systems. Memory 204 stores program code executed by processor 206 to control the other elements of access point 200. As shown in FIG. 2, memory 204 also contains Current Location Table 220 and ARP Status Table 230. Antenna 212 receives radio and optical signals from, and transmits signals to, network devices within its cell area. Information transmitted from a network device 300 is received via antenna 212 and processed by RF receiver 214 which demodulates the signal and converts the information into a digital signal. Information transmitted by access point 200 is formatted in processor 206, modulated by modulator 216 and then transmitted to antenna 212 for eventual transmission to an in-range network device 300 and access point 200. Information from the network device 300 is typically in the form of packets comprising data, a source identifier (i.e., the particular network device sending the information), and a destination identifier (i.e., the location to which the network device wishes to transmit the data). When the information from the mobile unit comprises an ARP packet, the destination identifier will cause the information to be "broadcast" to all other mobile units in the network.

Figure 3:
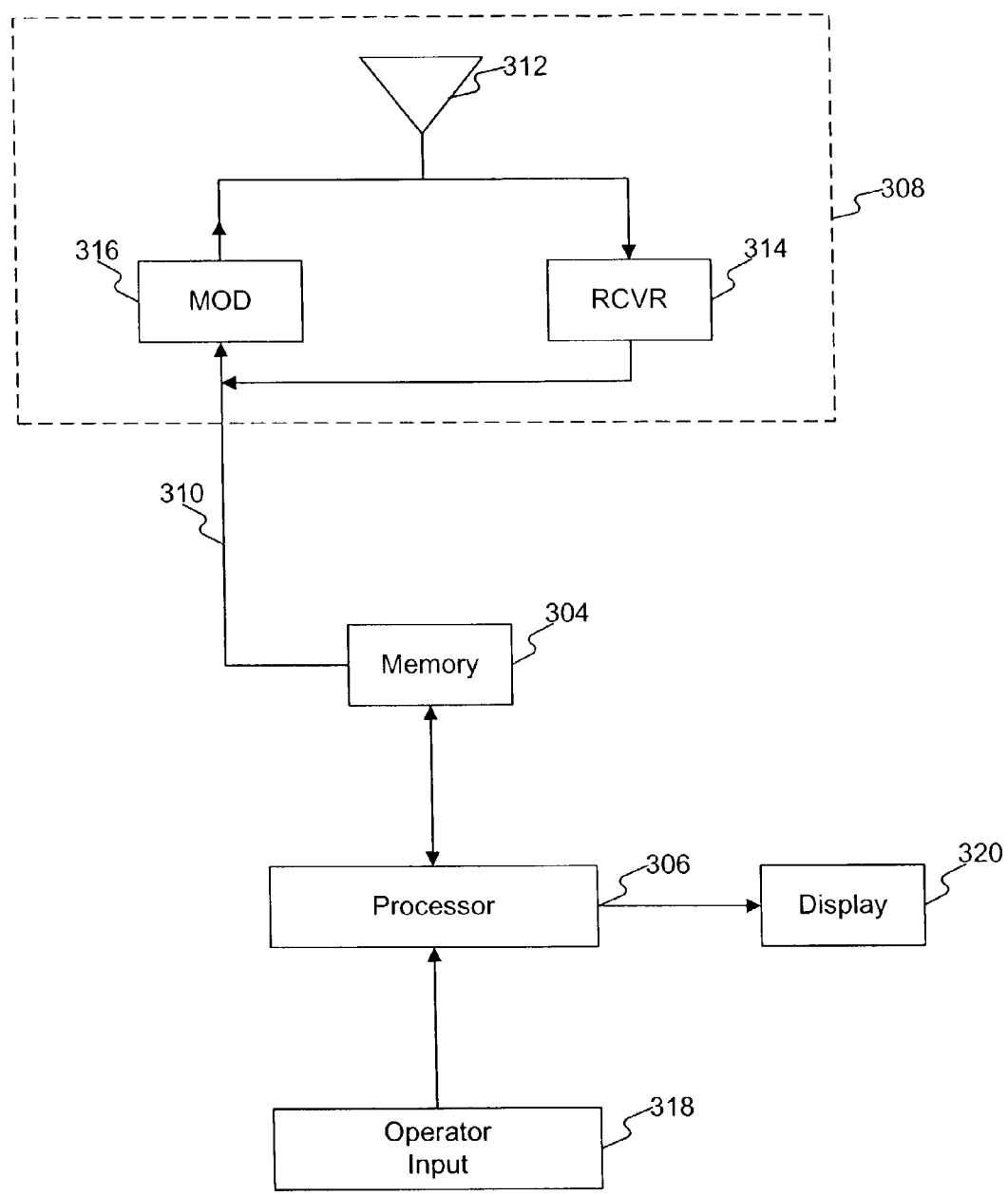
FIG. 3 is a diagram illustrating the major components of a network device in accordance with the present invention.

FIG. 3 shows a detailed block diagram of a typical network device 300. Like access points 200a-d, network devices 300 are comprised of a memory 304, central processor 306, RF section 308, and bus 310. Like RF section 208 in access point 200, RF section 308 is comprised of a modulator 316, receiver 314 and antenna 312. Network devices 300 additionally comprise a display 320, and an operator input terminal 318. Memory 304, central processor 306, RF section 308, and bus 310 perform functions similar to identical components in access point 200. Display 320 serves as a means for displaying information stored within the network device or received over network 10 via access point 200. Display 320 can be a flat panel liquid crystal display with alphanumeric capabilities, for example, or any other type of display as will be appreciated by those skilled in the art. Operator input terminal 318 may include a keyboard, microphone, touch sensitive display, etc. to allow an operator to input data to be communicated to the network 10 such as text, voice, image data, etc.

Figure 4:
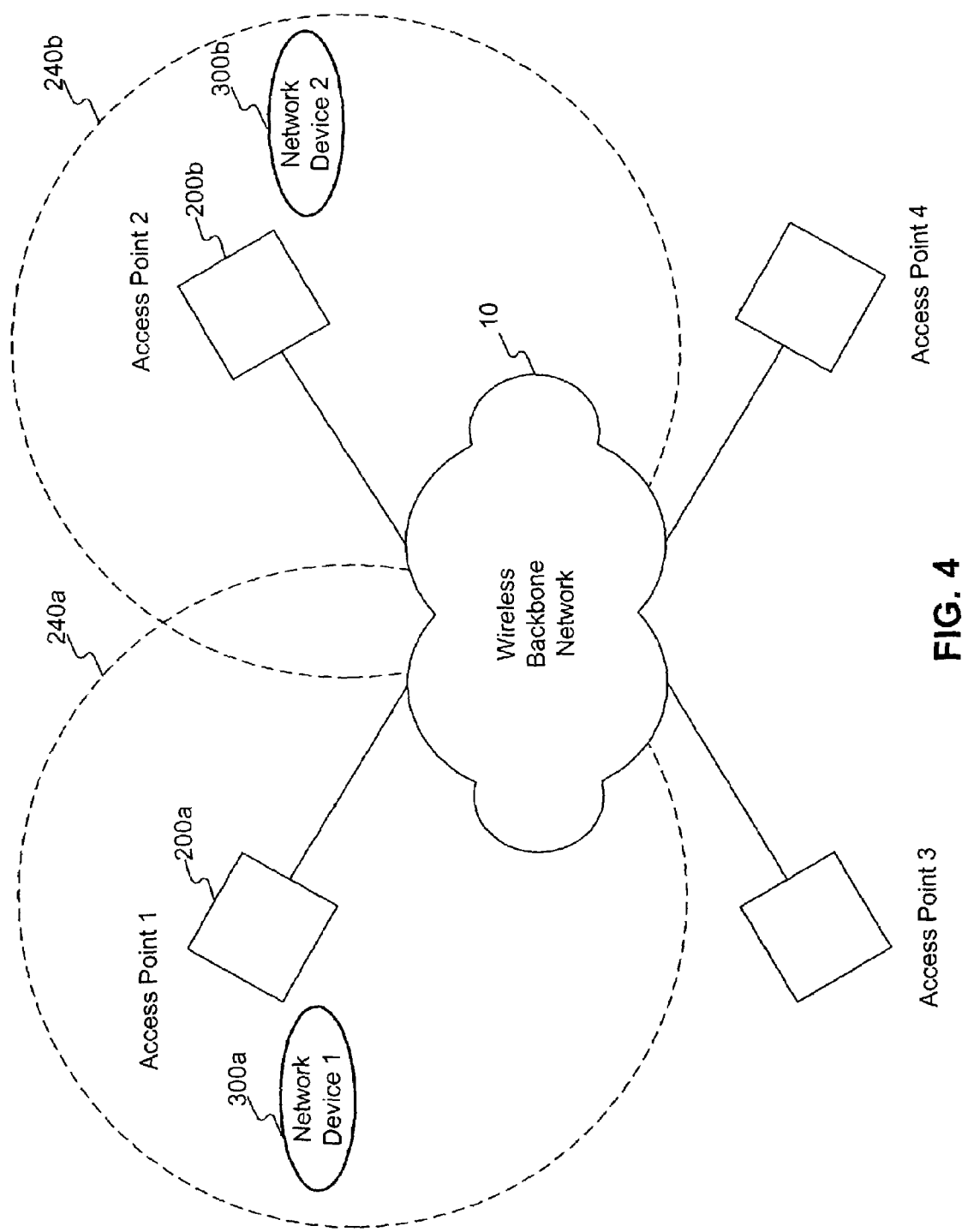
FIG. 4 is a diagram illustrating the Wireless Backbone network in accordance with the present system, including the coverage areas of two adjacent access points.

Referring now to FIG. 4, it is shown that mobile network devices may be located nearby and interface with access points 200 on network 10. Network device 300a is in range of access point 200a as indicated by the coverage area 240a of access point 200a. Furthermore, network device 300a is also "registered" with access point 200a, meaning that communication between network device 200a and all out of range network devices (devices that are not in coverage area 240a) will be via access point 200a. A network device 300 may be in range of several access points but may only be registered with one access point 200 at any one instance in time. As the location of the network device 300 changes, it may register with a second access point 200 thereby resulting in a termination of the registration with the first access point. Registration may also be terminated if there is no communication between the network device and its corresponding access point for a predetermined period of time.

As mentioned above in connection with FIG. 2, the memory 204 in each access point 200 includes a "current location" table 220. The current location information for access point 200a and access point 200b are shown in the following table is represented at time t1 which occurs when network devices 300a and 300b are in the locations shown in FIG. 4. It should be noted that in practice, the Current Location table may identify each network device by its hardware address.

| Current Location | |
|---|---|
| Device | Location |
| ND1 | AP1 |
| ND2 | AP2 |

Each access point 200 includes a Current Location table 220 that has an entry for each network device 300 currently registered with the access point 200. The information in Current Location table 220 is constantly updated in a manner well known to one of skill in the art. For that reason, and in the interest of brevity, the process for updating the Current Location table 220 will not be explained here.

At time t1 as shown in FIG. 4, network device 300a is registered with access point 200a, and network device 300b is registered with access point 200b. In the Current Location table 220 of access point 200a, network device 300a is indicated as registered with access point 200a (identified as AP1). Also, network device 300b is indicated as registered with access point 200b (identified as AP2). This is accomplished by setting an appropriate flag, or the like, in memory 204. It will be appreciated that while the information stored in the respective tables is intended to represent IP addresses and Ethernet addresses, for ease of understanding it is shown in the respective tables as alphanumeric shorthand (e.g., AP1, AP2, 300a, 300b, etc.)

Figure 5:
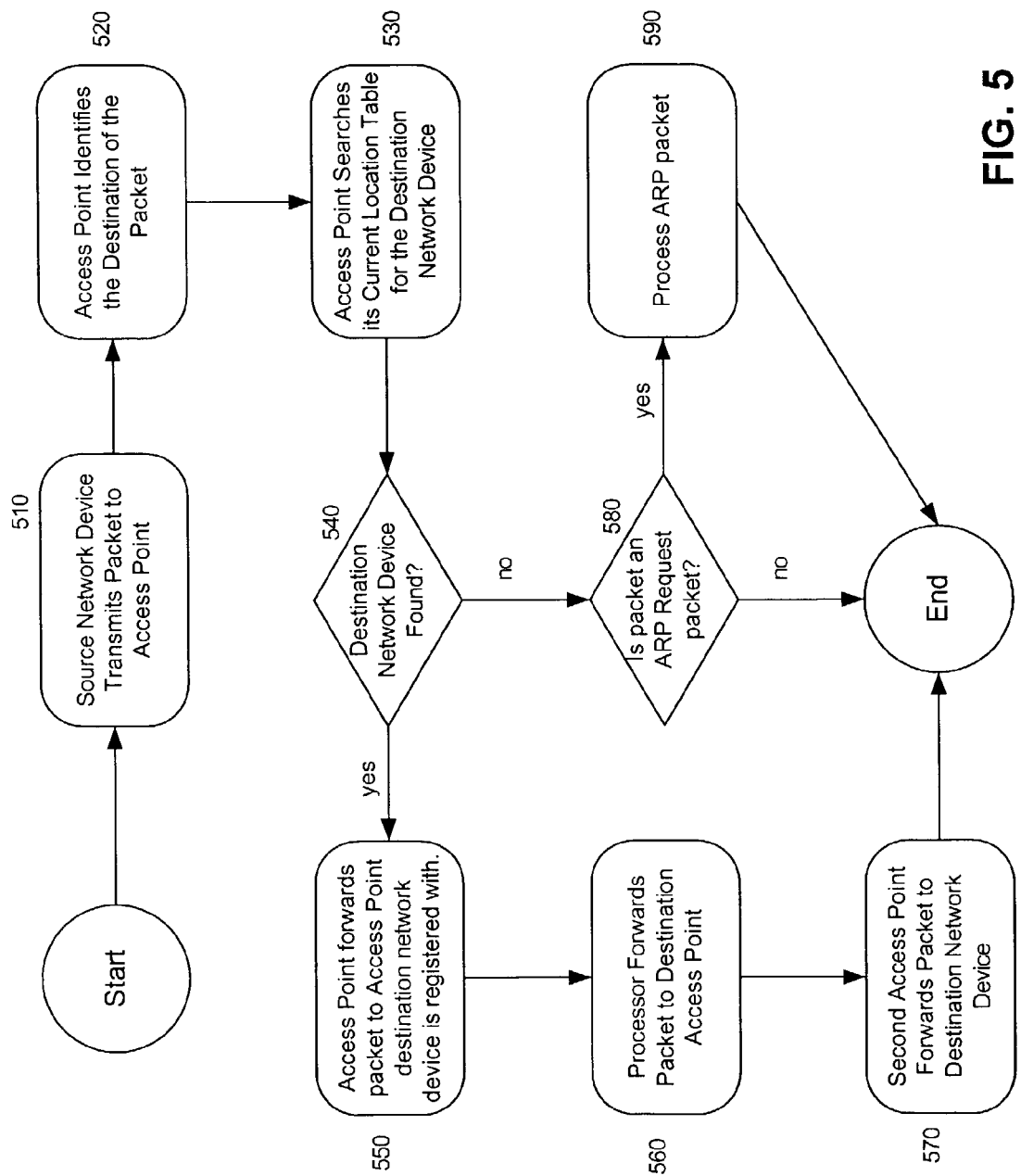
FIG. 5 is a detailed flow chart depicting the steps performed by the present invention when it receives a request to transmit a message to a destination network device in accordance with the present invention.

Referring now to FIG. 5, a detailed flow diagram is shown that describes the process of "unicast" communication between a first network device and a second network device when both network devices are associated with network 10. Unicast communication is communication in which there is a single source and a single destination. As shown in step 510, network device 300a transmits a packet addressed to network device 300b to access point 200a (the access point to which network device 300a is currently registered). Next, in step 520, processor 206 in access point 200a identifies the destination of the packet as network device 300b. Processor 206, in step 530 then searches memory 204 for the location of the desired network device. If processor 206 finds the desired network device (step 540), it reads the information (step 550) from Current Location table 220 to determine the access point on network 10 that the destination network device is registered with. Once the second access point is identified, the packet is forwarded to the second access point (step 560), which in turn forwards the packet to the destination network device (step 570).

If the desired network device is not found (step 540), processor 206 determines whether the packet is an ARP packet (step 580). If the packet is not an ARP packet, processing terminates. If the packet is an ARP packet, the present invention processes the ARP packet (step 590) and processing terminates.

The ARP protocol is a standard, well-defined protocol that permits a network device to discover the hardware address of another network device, given the IP address of the other network device. Referring to FIG. 6, the basic format of an ARP packet is shown. The ARP packet is generally designated 600 and includes a "type" field 610. As shown in FIG. 6, an ARP packet may either be "Request" or "Response" packet. The packet 600 may also include fields for destination and source hardware addresses (620 and 630, respectively) and destination and source IP addresses (640 and 650, respectively). It should be noted that these addresses are separate and in addition to the source and destination addresses that may comprise a portion of the header of every packet transmitted by a network device.

Figure 7:
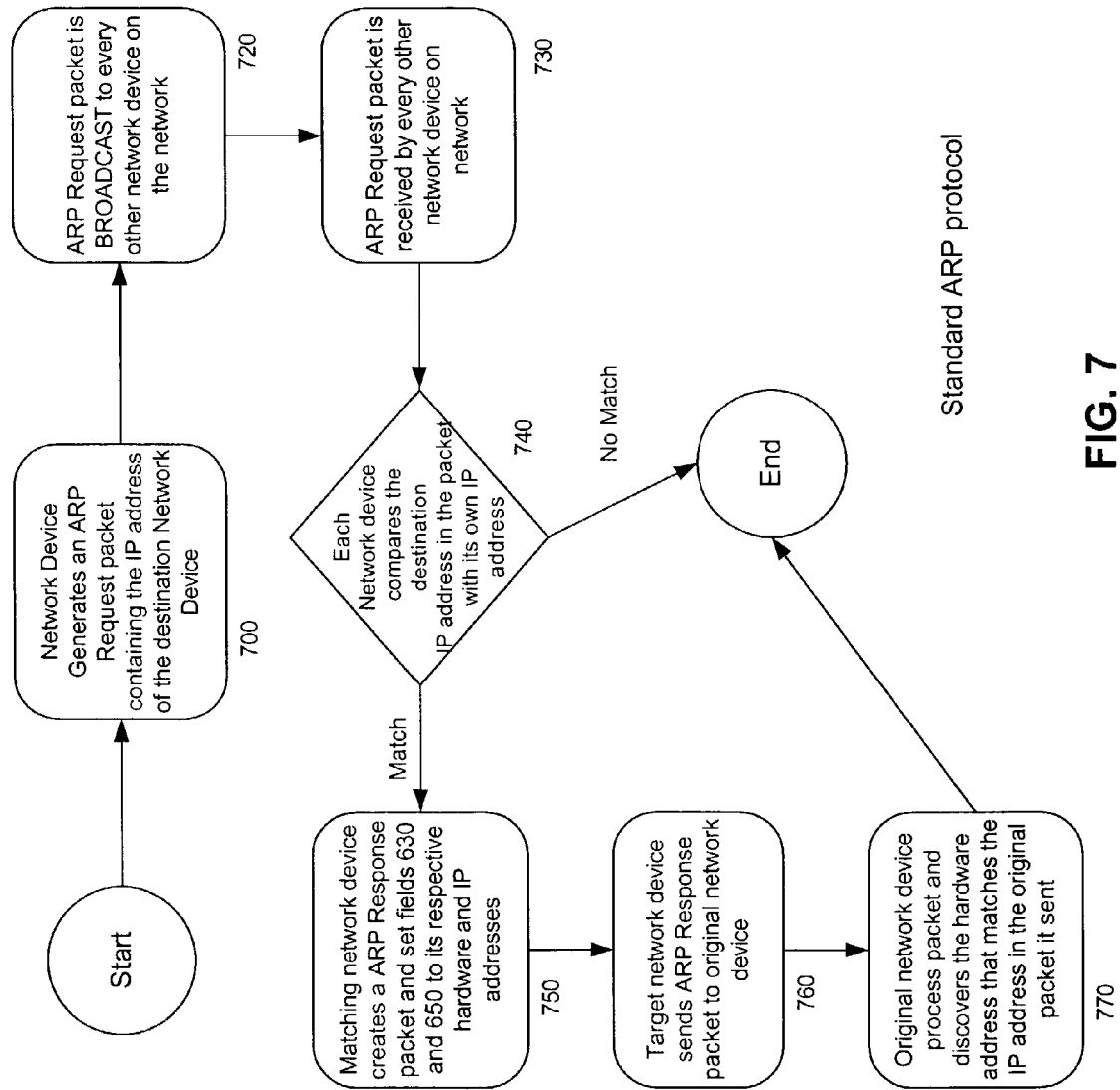
FIG. 7 is a detailed flow chart depicting the steps performed by the present invention when it broadcasts an ARP message to a plurality of access points.

Referring to FIG. 7, there is shown a flow diagram that briefly describes the ARP protocol. A more detailed description of the protocol may be obtained from literature describing the technical workings of the Internet (i.e., Internetworking With TCP/IP, by Douglas Comer, published by Prentice Hall, 1988). A network device generates an ARP Request packet containing the IP address of the network device whose hardware address it wishes to discover (step 700) and broadcasts it to all other network devices (step 720). Upon receiving the ARP packet (step 730) each network device compares the destination IP address 640 with its own IP address (step 740). Network devices whose IP addresses do not match the destination IP address 640 ignore the packet and processing terminates. If a network device's IP address matches the destination IP address 640 in the ARP packet, that network device creates an ARP Response packet that contains its hardware and IP addresses (step 750) and sends it to the original network device (step 760). The original network device receives this packet and discovers the hardware address of the second network device (step 770).

When access point 200 receives an ARP Request packet, the destination of the packet will not refer to any particular network device but instead will be "broadcast". In order for the ARP protocol to function correctly, access point 200 must forward the ARP Request packet to all other access points in network 10, so that the packet may be relayed to all possible network devices.

In the prior art, when a network device created an ARP Request packet that did not illicit an ARP Response packet, the network device repeatedly retransmitted the ARP Request packet a predetermined number of times or until a response was received. This can cause an unnecessarily large amount of traffic across network 10.

In the present invention, three procedures referred to as "ARP caching," "responseless ARP reduction," and "ARP response waiting," allow access points 200 to reduce the unnecessary broadcasting of ARP traffic over a wireless backbone network. For the purpose of explanation these procedures will be described separately, although it is understood they are actually incorporated together in the invention.

Figure 8:
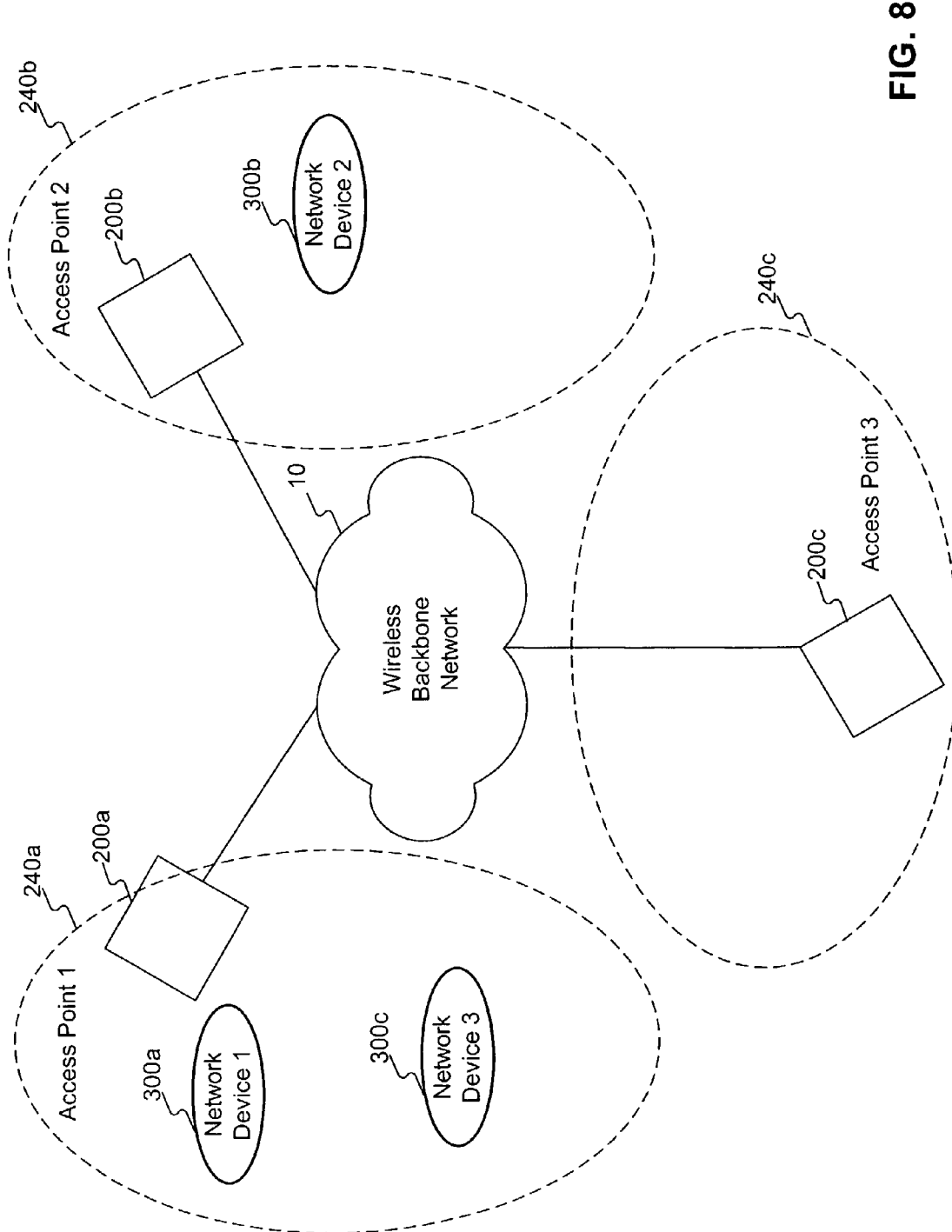
FIG. 8 is a diagram illustrating the wireless backbone network in accordance with the present system, including coverage areas of three adjacent access points.

"Caching" is a method by which an access point 200 utilizes an "Address Table" to maintain a record of IP addresses and hardware addresses associated with each network device 300. By way of example, suppose network device 300a, as shown in FIG. 8, wishes to discover the hardware address of network device 300b, given only its IP address. Suppose that network devices 300a, 300b, and 300c, as shown in FIG. 8, have IP addresses IP1, IP2, and IP3, respectively, and hardware addresses HW1, HW2, and HW3, respectively. A detailed flow diagram shown in FIG. 9 describes how ARP traffic is processed when caching is employed.

Figure 9A:
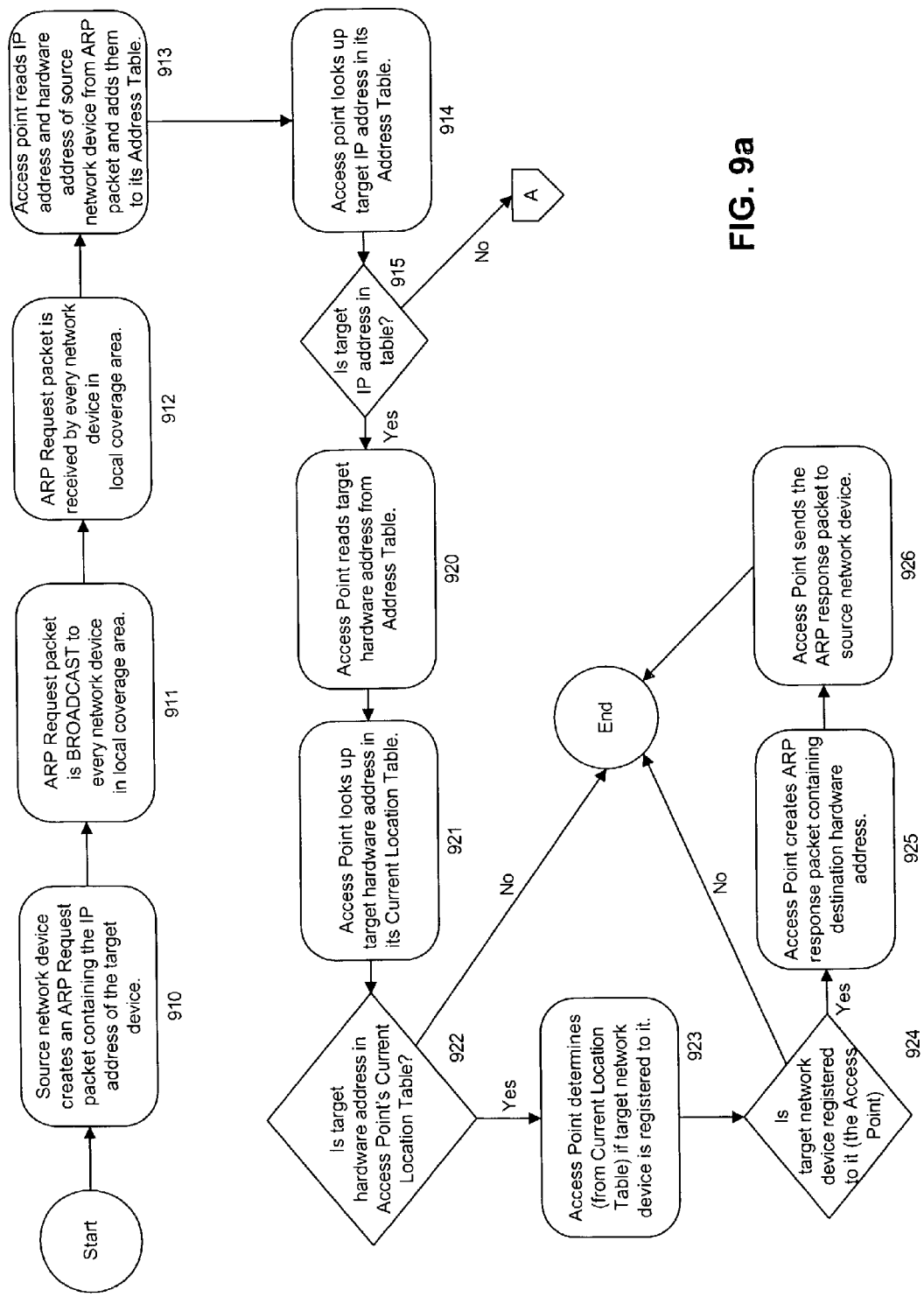
FIGS. 9A and 9B are a detailed flow chart depicting the steps performed by the present invention when a wireless network device broadcasts an ARP request packet.
Figure 9B:
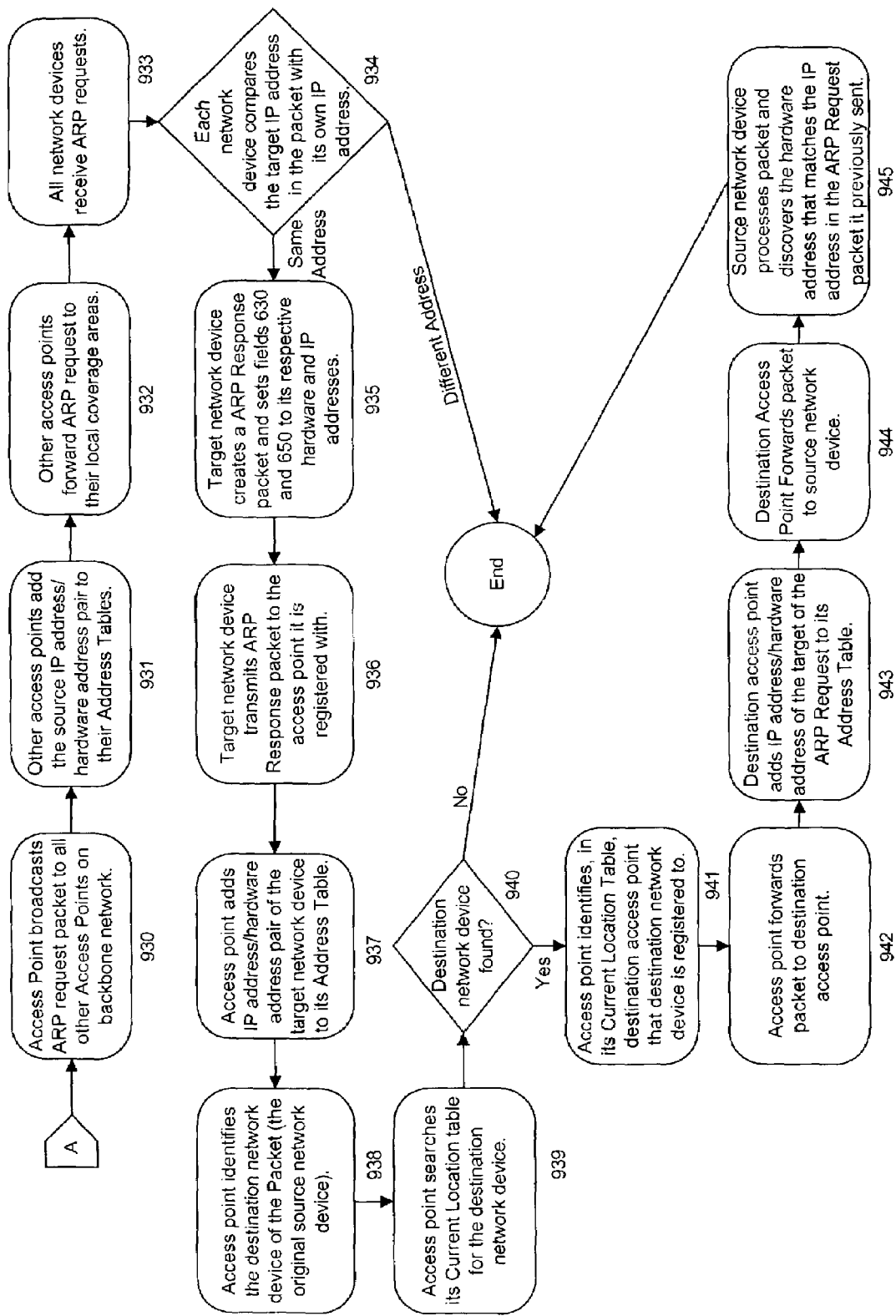

As shown in FIG. 9, network device 300a creates an ARP Request packet containing the target IP address (IP2), as well as its own IP address (IP1) and hardware address HW1 (step 910). This packet is then broadcast throughout its local coverage area 240a (step 911). For purposes of this example, it is assumed that Access Point 200a's Address Table is empty. The ARP packet is received by network device 300c and access point 200a (which represent all devices in coverage area 240a) (step 912). Upon receiving the ARP packet, access point 200a adds the source IP address/hardware address pair to its Address Table (step 913). Following this addition, the Address Table in access point 200a will read:

| ADDRESS TABLE | |
|---|---|
| IP Addr | Hardware Addr |
| IP1 | HW1 |

Access point 200a then checks its Address Table for the target IP address (IP2). (step 914) Since the IP Address associated with the network device is not in its Address Table, access point 200a broadcasts the ARP Request packet to all other access points 200 (step 930). Upon receipt of the ARP Request packet, these access points 200 add IP address (IP1) and hardware address HW1 (read from the packet) to their respective Address Tables in much the same manner access point 200a previously did (step 931). They also broadcast the ARP Request packet to their local coverage areas 240 (step 932). If the IP address associated with the network device is in access point 200a's Address Table (step 915), processing flows to step 920 where access point 200a reads the target hardware address from its Address Table. Next, access point 200a looks up the target hardware address in its Current Location Table (step 921). If the target hardware address is in the Current Location Table (step 922), processing flows to step 923. If it is not, processing terminates. In step 923, access point 200a determines (from the Current Location Table) if the target network device is registered to it. If it is, processing flows to step 925. If it is not, processing terminates. In step 925, access point 200a creates an ARP response packet that contains the destination hardware address, and in step 926, access point 200a sends the ARP response packet to the source network device.

When network device 300b receives the ARP Request packet from access point 200b (step 933), it compares the target IP address in the packet with its own IP address, (step 934). If the target IP address is different, processing terminates. If it is the same, it creates an ARP Response packet containing its hardware address (11W2), and its IP address (IP2) (step 935). It then transmits the ARP Response packet to network device 200b (step 936). In step 937, access point 200b then determines whether IP address/hardware address pair is already in its Address Table. If it is, processing flows to step 938. If the IP address/hardware address pair is not in the Address Table, access point 200b adds the address pair to its Address Table. In step 938, access point 200b identifies the destination network device from the packet, and then searches its Current Location Table for the destination network device. If the destination network device is found, processing flows to step 941. If it is not found, processing terminates. In step 941, access point 200b identifies the access point to which the destination network device is registered, and in step 942, access point 200b forwards the packet to the destination access point. Processing then flows to step 943, where the destination access point receives the packet and then determines whether to add the IP address/hardware address of the target network device to its Address Table. If the address pair is not present in the Address Table, the access point adds the address pair to its Address Table. If the address pair is already present in the Address Table, processing flows to step 944 where the destination access point forwards the packet to the source network device. Next, processing flows to step 945 where the source network device processes the packet and discovers the hardware address that matches the IP address in the ARP Request packet that was previously sent. Following this processing, the Address Table of access point 200a will read:

| ADDRESS TABLE | |
|---|---|
| IP Addr | Hardware Addr |
| IP1 | HW1 |
| IP2 | HW2 |

Now, suppose that network device 300c in FIG. 8 wishes to discover the hardware address of network device 300b. It will create an ARP Request packet containing the target IP address (IP2) in addition to its own IP address (IP3) and hardware address (HW3). This packet will be broadcast and received by access point 200a, which will add IP address (IP3) and hardware address (HW3) to its Address table. Access point 200a will then look up the target IP address (IP2) in its Address Table, and identify the hardware address (HW2) associated with it. Access point 200a will then look up hardware address (HW2) in its Current Location table, which reads:

| CURRENT LOCATION | |
|---|---|
| Device | Location |
| HW1 | 200a |
| HW2 | 200b |
| HW3 | 200a |

By reading its Current Location Table, access point 200a will learn that the target network device (HW2) is registered with another access point. It will then create an ARP Reply packet containing the IP address (IP2) and hardware address (HW2) of the target network device and send the packet to network device 300b. Therefore, by storing, or caching, hardware address (HW2) in its Address Table, access point 200a has eliminated the need to broadcast the ARP Request packet across backbone network 10. At this point in time, the Address Table in access point 200a reads as follows:

| ADDRESS TABLE | |
|---|---|
| IP Addr | Hardware Addr |
| IP1 | HW1 |
| IP2 | HW2 |
| IP3 | HW3 |

As a final example, suppose network device 300a in FIG. 8 wishes to discover the hardware address of network device 300c. In operation, both access point 200a and network device 300c receive an ARP Request packet from network device 300a. Access point 200a looks up target IP address (IP3) in its Address Table to identify the hardware address (HW3) of network device 300c. It then looks up the target hardware address (HW3) in its current location table to determine that network device 300c is registered with it (as opposed to with another access point). Upon learning this, access point 200a will ignore the ARP Request packet. Network device 300c will send an ARP Response directly to Network device 300a, as both network devices are in the same coverage area. As in the previous example, by using the Address Table, access point 200a has eliminated the need to broadcast the ARP Request across backbone network 10.

Sometimes a network device will broadcast an ARP request packet for a target network device that can not respond (for example, if it is powered down or is out of range of an access point.) When a network device transmits an ARP request packet and does not receive an ARP response packet, it will typically retransmit the ARP request packet until it receives a response. If the retransmissions occur frequently enough, this can cause many unnecessary ARP packets to be broadcast across the backbone network. "Responseless ARP Reduction" is a process that limits that number of ARP packets that are broadcast across the backbone network when the target device of the ARP is not responding.

Suppose that network device 300a transmits an ARP request packet to a network device that is not in range of any access point 200. In that case, network device 300a will never receive an ARP response packet and, after some delay, will retransmit the ARP request packet. Each time access point 200a receives the ARP request packet from network device 300a, it will look up the target IP address in its Address Table. Since the IIP Address of the out-of-range network device is not in access point 200a's Address Table, it will broadcast the packet across the backbone network to other access points. If network device 300a generates ARP request packets for the out-of-range network device at a high enough rate, the broadcasting will overwhelm the backbone network with ARP broadcast network traffic. One solution to this problem is to limit the rate that access point 200a transmits ARP packets across the backbone network by having the other access points periodically rebroadcast ARP request packets for the out-of-range network device in their local coverage area. More specifically, when access point 200a first receives the ARP request packet from network device 300a, it broadcasts the request across the backbone network to the other access points 200. Each access point 200 that receives the ARP request packet then sends a packet back to the originating access point 200a signifying that it will periodically broadcast the ARP request packet to its local coverage area for a specified amount of time (e.g., 5 minutes) unless it receives an ARP response packet. During this time, if network device 300a retransmits the ARP request packet, access point 200a will not re-broadcast it across the backbone network. Suppose the out-of-range network device (e.g., Network Device 300d-IP Address IP4, Hardware Address HW4) enters access point 200b's coverage area 3 minutes after network device 300a transmitted its first ARP request packet. Access point 200b and network device 300a have been periodically broadcasting ARP request packets for network device 300d, only the first one being transmitted by access point 200a over the backbone network. When network device 300d enters access point 200b's coverage area, it will receive an ARP request packet from access point 200a. It will then send an ARP response packet via access points 200b and 200a to network device 300a as previously described in steps 935 through 945 (FIG. 9). As a result, while network device 300a periodically broadcasts ARP request packets for 3 minutes, only one packet is transmitted across the backbone network. This solution exploits the assumption that broadcast network traffic on the backbone network is relatively expensive in comparison to broadcast network traffic in the local coverage areas.

One way to implement this capability is for each Access Point 200 to keep track of three tables, which shall be designated as the Local ARP Table, the Remote ARP Table, and Network Device ARP Table. The Local ARP Table has an entry for each target network device 300 that the access point 200 is broadcasting ARP packets for in its local coverage area. Associated with each table entry is a list of the other Access Points 200 that have sent ARP requests for the target network device 300, as well as a "timeout" value, after which ARP packets will not longer be broadcast to the local coverage area for the target network device. The Remote ARP Table has an entry for each target network device 300 being ARPed for by other access points. For each target network device 300 being ARPed for, the Remote Table keeps track of which access points are broadcasting ARP packets to their local coverage area for the target network device 300, and how long each one will do so (the same "timeout" value as in the Local Table). The Network Device Table keeps track of which local network devices have transmitted requests for each target network device being ARPed for by other access points.

Figure 10:
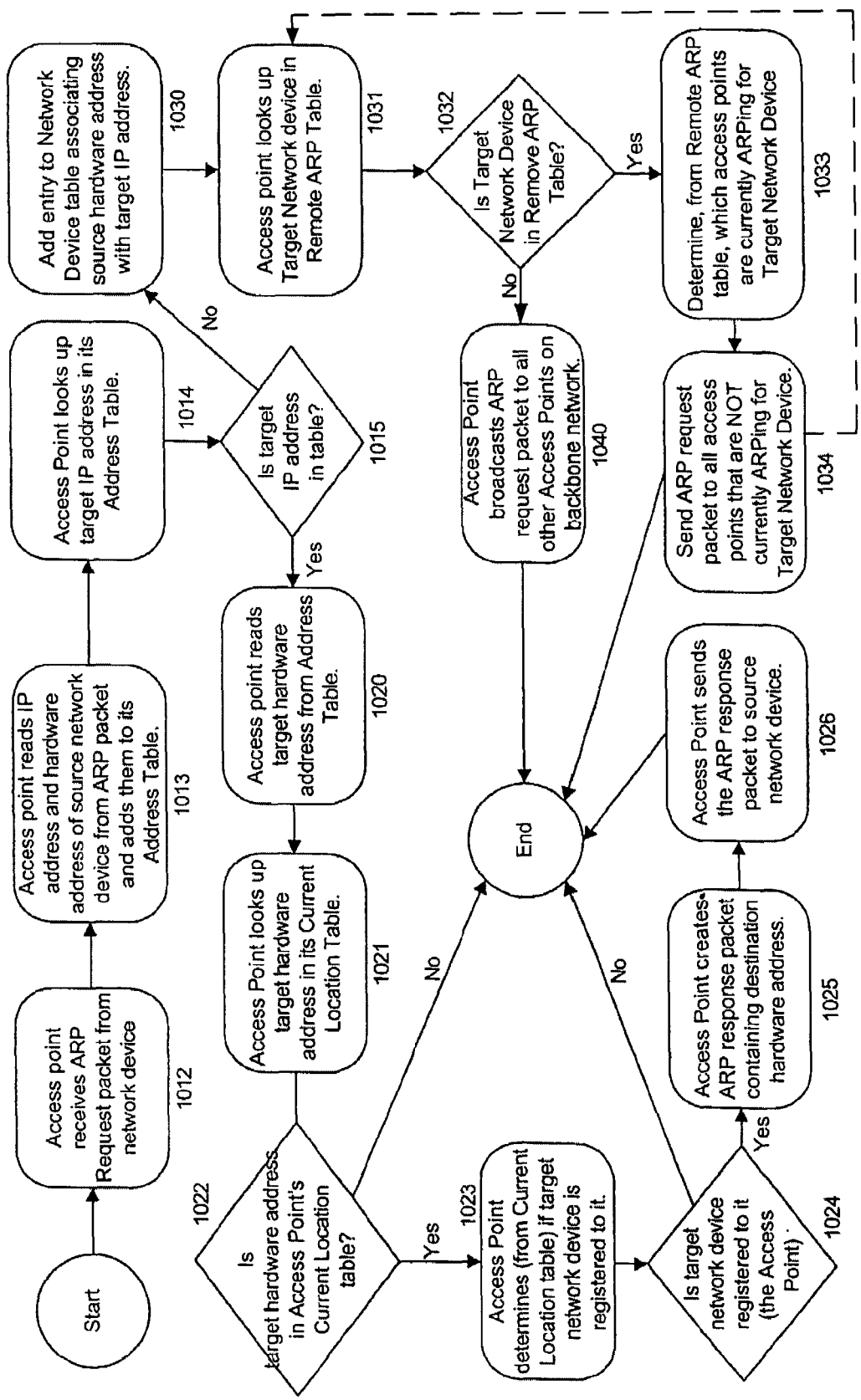
FIG. 10 is a detailed flow chart depicting the steps performed by the present invention when an access point receives an ARP request from a network device.

The use of these tables is illustrated below. Referring to FIG. 8, suppose that network devices 300a and 300c are in the local coverage area of access point 200*a*, and that network device 300*b* is in the local coverage area of access point 200*b*. Further, suppose that network devices 300*a*, 300*b*, and 300*c* are all periodically broadcasting ARP request for the network device 300*d*, which is out of range of all access points. Referring now to FIG. 10, it is shown that when access point 200*a* receives the first ARP request from network device 300*a* (step 1012), it will add network device 300*a*'s IP/hardware address pair to its address table (step 1013). After this, access point 200*a*'s address table reads as follows:

| ADDRESS TABLE | |
|---|---|
| IP Addr | Hardware Addr |
| IP1 | HW1 (network device 300a) |

Access point 200*a* will then look up the target IP address (IP4), in its Address Table (step 1014). If the target IP address is in its Address Table (1015), processing flows to step 1020, where access point 200*a* reads the target IP address from its Address Table. Processing then flows to step 1021 where access point 200*a* determines whether the target hardware address is in its Current Location Table. If it is (step 1022), processing flows to step 1023. If it is not, processing terminates. In step 1023, access point 200*a* uses the Current Location Table to determine whether the target network device is registered to it. If the target network device is registered to the access point (step 1024), processing flows to step 1025. If the target network device is not registered to the access point, processing terminates. In step 1025, access point 200*a* creates an ARP response packet that contains the destination hardware address. Processing then flows to step 1026 where access point 200*a* transmits the ARP response packet to the destination network device. Since IP4 is not in its address table (step 1015), access point 200*a* will add the following entry in its Network Device Table (step 1030):

| NETWORK DEVICE TABLE | |
|---|---|
| Target IP | Source Address |
| IP4 | HW1 |

The purpose of the Network Device Table is to keep track of the devices that have ARPed for another device. When access point 200*a* eventually receives a reply from another access point, it will use the Network Device Table to determine which network devices to forward the reply to.

After adding the entry to its Network Device Table, processing flows to step 1031, where access point 200*a* looks up the target IP address (IP4) in its Remote ARP Table (step 1031). If the target IP address is in the Remote ARP Table, processing flows to step 1033, where access point 200*a* uses the Remote ARP Table to determine which access points are currently ARPing for the target network device. Next, access point 200*a* sends an ARP Request packet to all access points that are not currently ARPing for the network device. Since at this point in time access point 200*a*'s Remote ARP Table is empty, processing flows to step 1040 where the access point then forwards the ARP request to all other access points.

Figure 11:
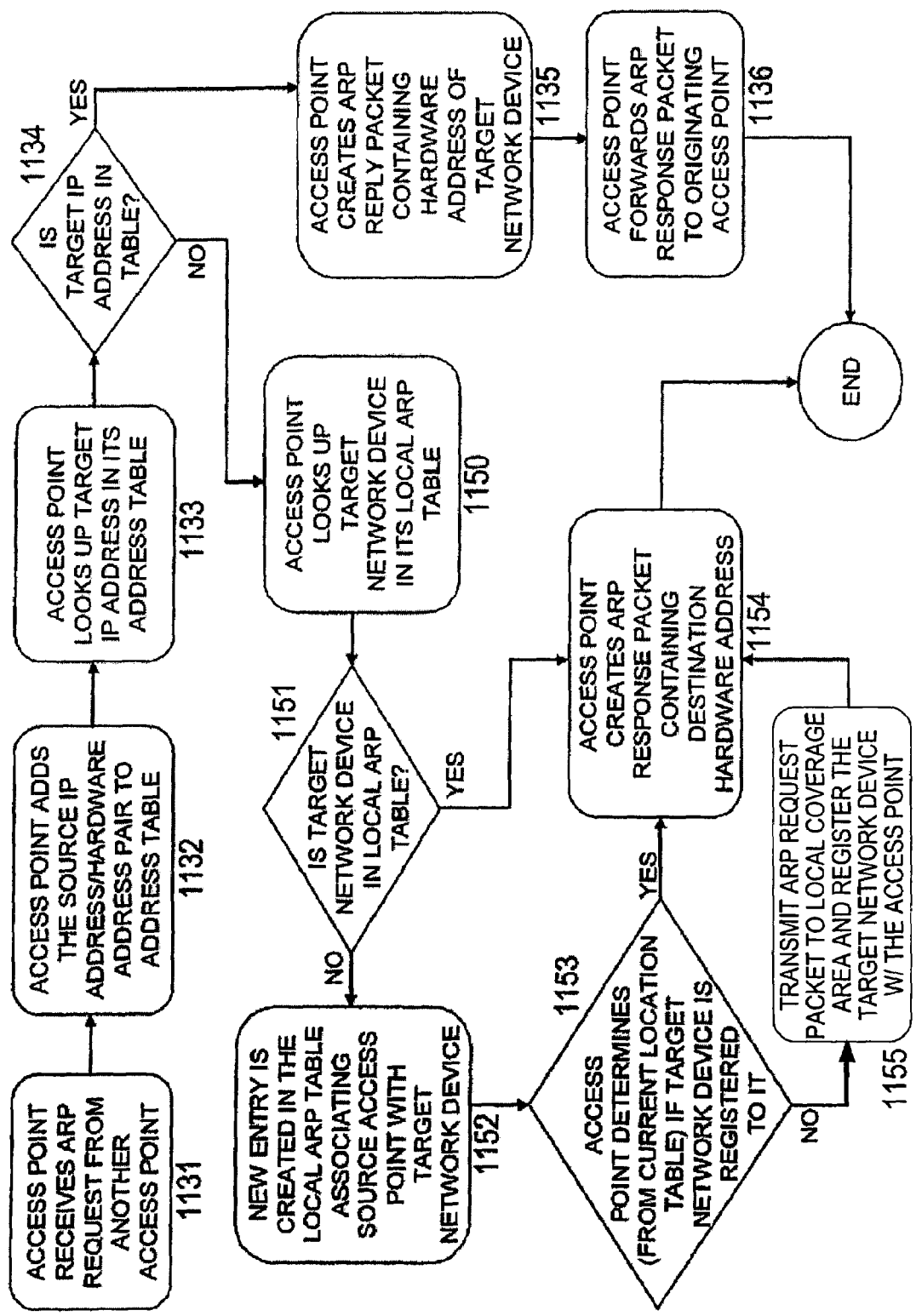
FIG. 11 is a detailed flow chart depicting the steps performed by the present invention when an access point receives an ARP request from another access point.

Referring now to FIG. 11, the process for maintaining the Local ARP Table will now be explained. When another access point receives an ARP request from access point 200*a* (step 1131), it adds the IP/Hardware address to its address table (step 1132). The other access points then determine whether the target IP address (IP4) is in its address table (step 1133). If the target IP address is in the Address Table (step 1134), processing flows to step 1135 where access point 200*a* creates an ARP reply packet containing the hardware address of the target network device. Processing then flows to step 1136 where access point 200*a* forwards the ARP response packet to the originating access point. If the target IP address is not the Address Table, processing flows to step 1150 where access point 200*a* determines whether the target network device is in its local ARP Table. If the target network device is in the Local ARP Table, processing flows to step 1154. If it is not, processing flows to step 1152 where an new entry is created in the Local ARP Table that associates the source access point the target network device. Processing then flows to step 1153 where Access Point 200*a* determines from its Current Location table if the target network device is registered with the access point. If this is indeed the case, processing flows to step 1154 where the access point creates an ARP response packet containing the destination hardware address of the target network device. Otherwise, processing flows to step 1155 where the access point transmits ARP request packets to its local coverage area for the network device with IP address (IP4) and registers the target network device before proceeding to step 1154. For example, it is assumed that none of the access points have the target IP address (IP4), in either their address tables or their local ARP tables. Therefore, each other access point adds the following entry to its local ARP table:

| LOCAL ARP TABLE | | |
|---|---|---|
| Target IP | Source Access Point | Timeout |
| IP4 | Access point 200a | 5 minutes |

For illustration purposes, the timeout value in the local ARP table has been specified as 5 minutes. However, any value may be used within the scope of the present invention. Each other access point periodically sends ARP request packets to its local coverage area for the network device with IP address (IP4) for the next 5 minutes (step 1155). Also each other access point sends a "periodic notify" packet to access point 200*a*, specifying the target IP and the timeout value remaining (step 1154). Access point 200*a* receives these "periodic notify" packets, and updates its Remote ARP table accordingly. In the present example, ARP Table for access point 200*a* will read as follows:

| REMOTE ARP TABLE | | |
|---|---|---|
| Target IP | Remote Access Point | Timeout |
| IP4 | Access Point 200b | 5 minutes |
| IP4 | Access Point 200c | 5 minutes |

Now, suppose that network device 300*c*, which is located in the coverage area of access point 200*a*, transmits an ARP request packet for the network device with IP address IP4.

The ARP request packet is received by access point 200a. As previously mentioned, access point 200a will add an entry to its address table and network device table (Steps 1012-1030). These tables will then read as follows:

ADDRESS TABLE

| IP Addr | Hardware Addr |
|---|---|
| IP1 | HW1 (network device 300a) |
| IP3 | HW3 (network device 300c) |

NETWORK DEVICE TABLE

| Target IP | Source Address |
|---|---|
| IP4 | HW1 |
| IP4 | HW3 |

Access point 200a then looks up the target IP address (IP4) in its Remote ARP table (step 1031). According to its Remote ARP table, all other access points (access point 200b and access point 200c) are currently ARPing for the target network device. Therefore, access point 200a will not broadcast the ARP request across the backbone network. (steps 1033 and 1034). Even though network devices 300a and 300c may periodically broadcast ARP request packets for the target network device, only the first request packet was broadcast across the backbone network. When network device 300b, which is in access point 200b's coverage area, transmits an ARP request packet, access point 200b will perform the same steps (1012-1040) that access point 200a performed when network device 300a transmitted its first ARP request. At this point in time, each access point is periodically broadcasting ARP request packets to its local coverage area, however ARP request packets are not being broadcast across the backbone network.

Figure 12:
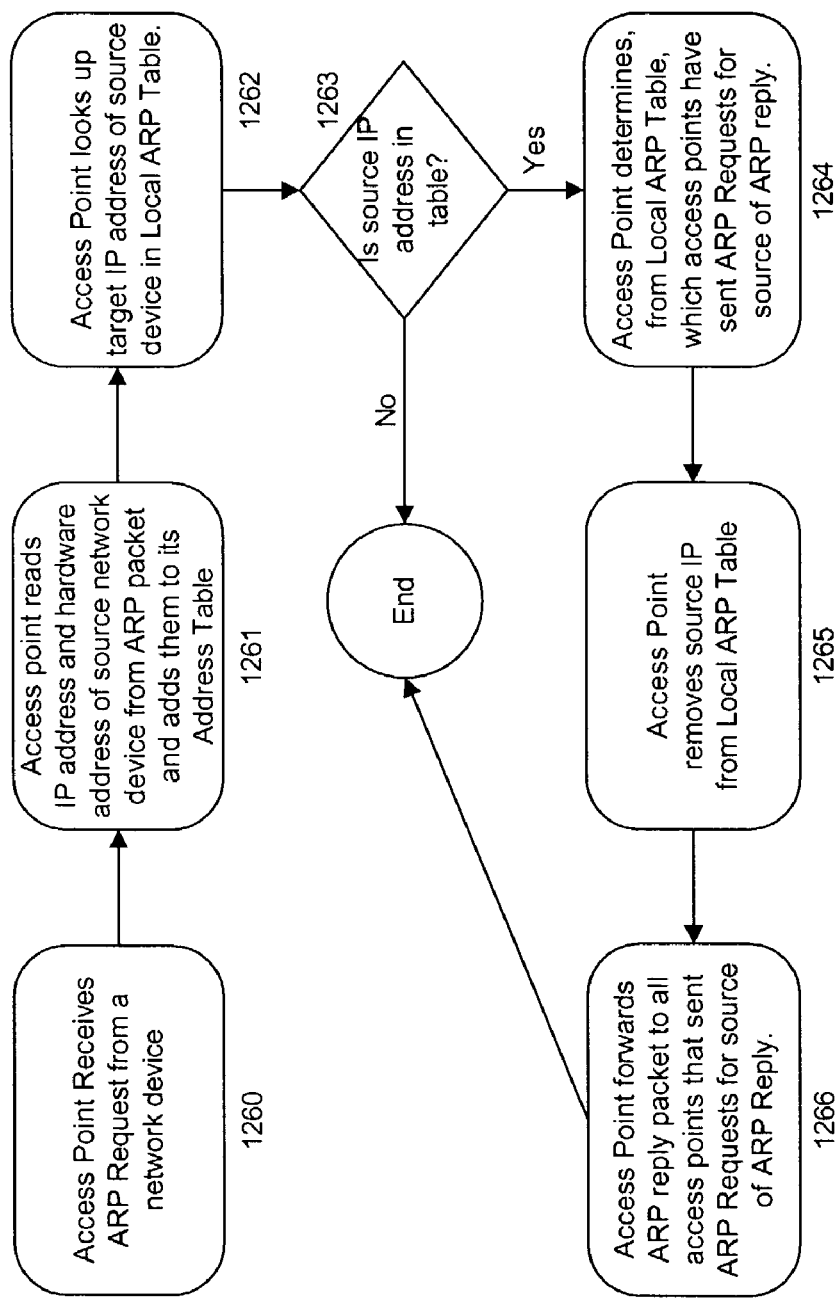
FIG. 12 is a detailed flow chart depicting the steps performed by the present invention when an access point receives an ARP request from a network device.

When the target network device appears in a local coverage area, processing depicted in FIG. 12 will be performed. Suppose that the target network device appears in the local coverage area of access point 200c. The target network device will receive the ARP request packet from access point 200c, and will respond with an ARP reply packet. Access point 200c will in turn, receive the ARP reply packet (step 1260). Next, access point 200c reads the IP address and hardware address of the source network device and adds them to its address table (step 1261). Access point 200c then looks up the IP address of the source device in the Local ARP Table (step 1262). At this point in time, the access point's local ARP table reads as follows:

LOCAL ARP TABLE

| Target IP | Source Access Point | Timeout |
|---|---|---|
| IP4 | Access point 200a | 5 minutes |
| IP4 | Access point 200b | 5 minutes |

The local table includes two entries for IP4 because access point 200a and access point 200b sent ARP request packets to access point 200c (due to the ARP request packets respectively sent by network devices 300a and 300b). If the source IP address is in the Local ARP Table, processing flows to step 1264. If the source IP address is not in the local ARP table, processing terminates. In step 1264, the access point determines from its Local ARP Table, which access points have sent requests for the source of an ARP reply and removes them from the Local ARP Table (Step 1265). Access point 200c then forwards an ARP reply packet to all access points that sent ARP requests for the source of an ARP reply.

Figure 13:
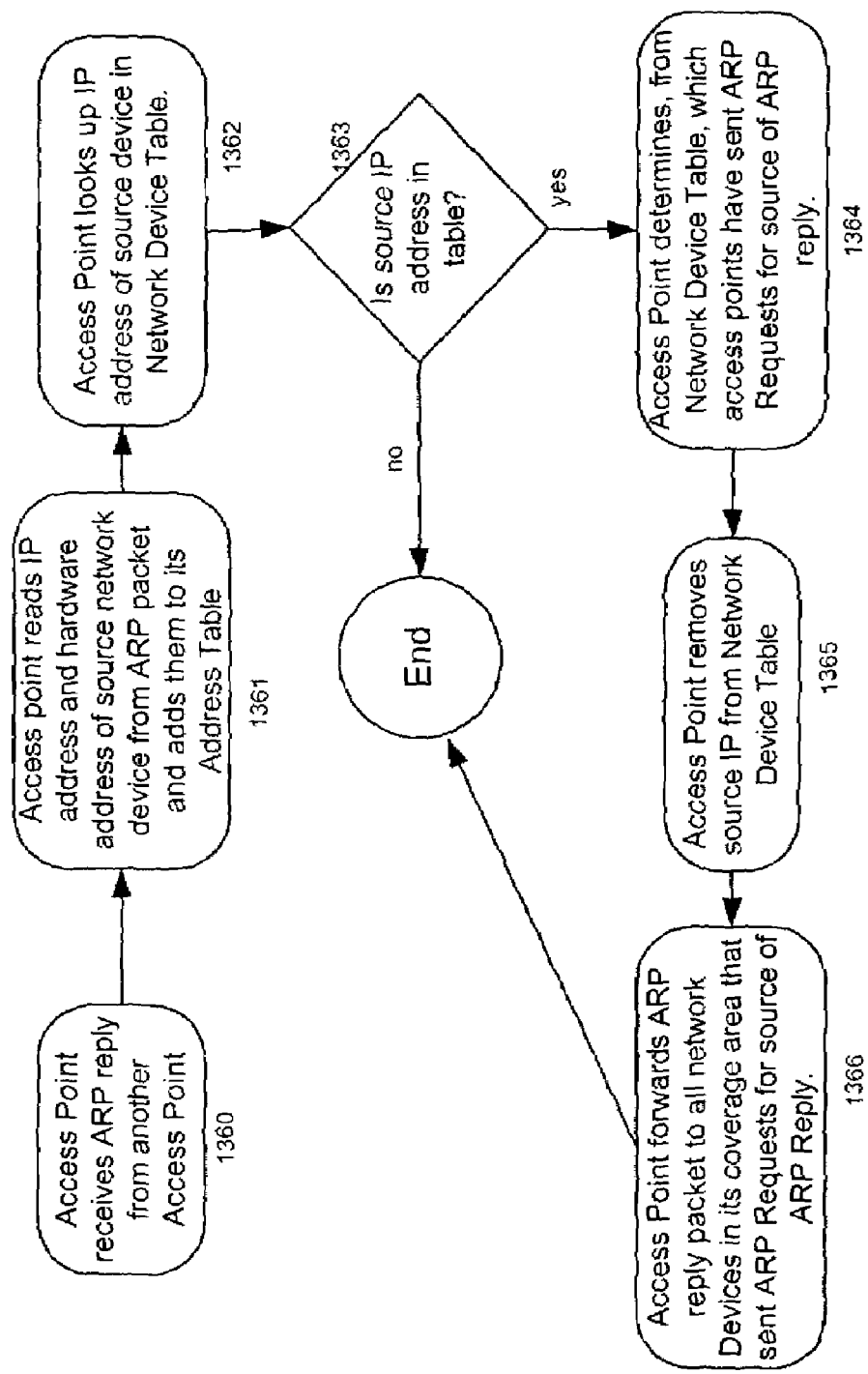
FIG. 13 is a detailed flow chart depicting the steps performed by the present invention when an access point receives an ARP reply from another access point.

Referring now to FIG. 13, there is shown a flowchart depicting the process performed when access point 200a receives the ARP reply packet from access point 200c. As shown in FIG. 13, access point 200a first reads the IP address and hardware address of the source network device from the ARP packet and adds them to its Address Table (step 1361). Access point 200a then looks up the IP address of the source device in the Network Device Table (step 1362). As previously noted, access point 200a's network device table reads as follows:

NETWORK DEVICE TABLE

| Target IP | Source Address |
|---|---|
| IP4 | HW1 (network device 300a) |
| IP4 | HW2 (network device 300c) |

Access point 200a then determines if the source IP address is in the Network Device Table (step 1363). If it is, processing flows to step 1364. If it is not, processing terminates. In step 1364, access point 200a determines from the Network Device Table, which access points have sent ARP requests. Next, access point 200a removes the source IP address from the Network Device Table in step 1365, and in step 1366, access point 200a forwards an ARP reply packet to all network devices in its local coverage area that sent ARP requests for the source address of the ARP reply. Since the source IP address (IP4) (which is the original source of the ARP reply packet, and the original target network device) is in the network device table, access point 200a forwards the ARP reply packets to network devices 300a and 300c (step 1366), and removes the entries from the table (step 1365). Likewise, access point 200b forwards the ARP request packet to network device 300b. Therefore, network devices 300a, 300b and 300c have all received the ARP reply packets, and the number of ARP request packets broadcast across the backbone network is greatly reduced.

From the foregoing description, it will be appreciated that the present invention provides an efficient system and method for minimizing traffic on a wireless backbone network. The present invention has been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

Although aspects of the present invention are described as being stored in memory, one skilled in the art will appreciate that these aspects can also be stored on or read from other types of computer-readable media, such as secondary storage devices, like hard disks, floppy disks, or CD-ROMs; a carrier wave from the Internet; or other forms of RAM or ROM. Similarly, the method of the present invention may conveniently be implemented in program modules that are based upon the flow charts in FIGS. 5, 7, and 9-13. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention and therefore no detailed computer program could be provided which would be applicable to these many different systems. Each user of a particular computer will be aware of the language and tools which are most useful for that user's needs and purposes.

Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented method for communicating an information packet on a wireless network including a plurality of wireless access points, said method comprising:
   receiving said information packet by a first one of said plurality of wireless access points from a first wireless network device registered with said first wireless access point, said information packet comprising a request to communicate with a second wireless network device and an identifier for the second wireless network device;
   searching a table stored on said first wireless access point with the identifier to determine at least a second wireless access point not attempting to register said second wireless network device;
   forwarding a second request by said first wireless access point to said at least second wireless access point to register said second wireless network device;
   repeating the searching and forwarding steps for at least a subset of said plurality of wireless access points on the wireless network;
   transmitting said request by said at least second wireless access point to at least one unregistered network device in-range of said at least second wireless access point; and
   registering said at least one unregistered network device on said at least second access point, wherein said at least one unregistered network device corresponds to said second wireless network device.

2. The method of claim 1, further comprising transmitting a response message from said at least second wireless access point to said first wireless access point, said response message including a reply from said second network device.

3. The method of claim 2, further comprising receiving said response message by said first wireless access point from said at least second wireless access point, said response message including a reply from said second network device.

4. The method of claim 1, wherein forwarding further comprises:
   receiving a message from said at least second wireless access point, said message including a period of time said at least second wireless access point will attempt to register said second wireless network device.

5. The method of claim 1, wherein the request is an address resolution protocol (ARP) message.

6. A computer-readable medium containing instructions, which when executed by a computing device, cause the computing device to carry out a method for communicating an information packet on a wireless network including a plurality of wireless access points, comprising:
   receiving said information packet by a first one of said plurality of wireless access points from a first wireless network device registered with said first wireless access point, said information package comprising a request to communicate with a second wireless network device and an identifier for the second wireless network device;
   searching a table stored on said first wireless access point with the identifier to determine at least a second wireless access point not attempting to register said second wireless network device;
   forwarding a second request by said first wireless access point to said at least second wireless access point to register said second wireless network device;
   repeating the searching and forwarding steps for at least a subset of said plurality of wireless access points on the wireless network;
   transmitting said request by said at least second wireless access point to at least one unregistered network device in-range of said at least second wireless access point; and
   registering said at least one unregistered network device on said at least second access point, wherein said at least one unregistered network device corresponds to said second wireless network device.

7. The computer-readable medium of claim 6, further comprising instructions, which when executed by a computing device, cause the computing device to transmit a response message from said at least second wireless access point to said first wireless access point, said response message including a reply from said second network device.

8. The computer-readable medium of claim 7, further comprising instructions, which when executed by a computing device, cause the computing device to receive said response message by said first wireless access point from said at least second wireless access point, said response message including a reply from said second network device.

9. The computer-readable medium of claim 6, wherein forwarding comprises:
   receiving a message from said at least second wireless access point, said message including a period of time said at least second wireless access point will attempt to register said second wireless network device.

10. A wireless network including a plurality of wireless access points with at least one associated wireless network device, said network comprising:
    means for receiving an information packet by a first one of said plurality of wireless access points from a first wireless network device registered with said first wireless access point, said information packet comprising a request to communicate with a second wireless network device and an identifier for the second wireless network device;
    means for searching a table stored on said first wireless access point with the identifier to determine at least a second wireless access point not attempting to register said second wireless network device;
    means for forwarding a second request by said first wireless access point to said at least a second wireless access point to register said second wireless network device;
    means for repeating the searching and forwarding steps for at least a subset of said plurality of wireless access points on the wireless network;

means for transmitting said request by said at least second wireless access point to at least one unregistered network device in-range of said at least second wireless access point; and means for registering said at least one unregistered network device on said at least second access point, wherein said at least one unregistered network device corresponds to said second wireless network device.

11. A computer system for communicating an information packet on a wireless network including a plurality of wireless access points, comprising:

a memory having program instructions; and a processor configured to use the program instructions to:

receive said information packet by a first one of said plurality of wireless access points from a first wireless network device registered with said first wireless access point, said information packet comprising a request to communicate with a second wireless network device and an identifier for the second wireless network device;

search a table stored on said first wireless access point with the identifier to determine at least a second wireless access point not;

attempting to register said second wireless network device;

forward a second request by said first wireless access point to said at least a second wireless access point to register said second wireless network device; and repeat the searching and forwarding steps for at least a subset of said plurality of wireless access points on the wireless network;

transmit said request by said at least second wireless access point to at least one unregistered network device in-range of said at least second wireless access point; and register said at least one unregistered network device on said at least second access point, wherein said at least one unregistered network device corresponds to said second wireless network device.

12. The computer system of claim 11, wherein the processor includes instructions to transmit a response message from said at least second wireless access point to said first wireless access point, said response message including a reply from said second network device.

13. The computer system of claim 12, wherein the processor includes instructions to receive said response message by said first wireless access point from said at least second wireless access point, said response message including a reply from said second network device.

14. The computer system of claim 11, wherein the forwarding instruction is further comprised of the following instructions:

receive a message from said at least second wireless access point, said message including a period of time said at least second wireless access point will attempt to register said second wireless network device.

* * * * *